INVENTOR.
WAYNE E. WERTS
BY Cecil J Areng
ATTORNEY

United States Patent Office 3,007,514
Patented Nov. 7, 1961

3,007,514
FLUID CONTROL DEVICE
Wayne E. Werts, South Bend, Ind., assignor to The Bendix Corporation, a corporation of Delaware
Filed Dec. 30, 1957, Ser. No. 706,194
9 Claims. (Cl. 158—36.4)

This invention relates to a fluid control mechanism and while not limited thereto, it is particularly adapted for use in the fuel system of a gas turbine engine.

Engine speed may be controlled by varying the effective area of a fuel restriction as a function of throttle lever position and compressor discharge pressure with the pressure differential across the restriction being maintained at a constant predetermined value. The conventional by-pass valve is positioned in response to variations from the predetermined constant pressure differential sensed across the variable area restriction, such that more or less of the total fuel pump discharge is diverted away from the inlet of the restriction back to the fuel pump inlet to cause a readjustment of the inlet pressure at the restriction which in turn adjusts the pressure differential to the predetermined constant value.

A disadvantage inherent to valve action of this sort is that in the attempt to maintain the pressure differential constant subsequent to variations in the area of the restriction the by-pass valve will tend to overshoot thus causing the inlet and outlet pressures at the restriction to go beyond the required value, which in turn causes the by-pass valve to overshoot in a reverse action. Subsequently, the by-pass valve is continually being repositioned causing fluctuations in the pressure differential across the variable area restriction with the result that undesirable unstable engine operation occurs.

It is therefore an object of this invention to provide an improved by-pass valve which is more stable in operation.

It is another object of this invention to provide an improved mechanism for controlling the rate of fluid flow through a fluid conduit.

It is still another object of this invention to provide a by-pass valve with a hydraulic feedback circuit.

Other objects and advantages will become apparent from the following description taken in conjunction with the drawings, wherein.

Figure 1:
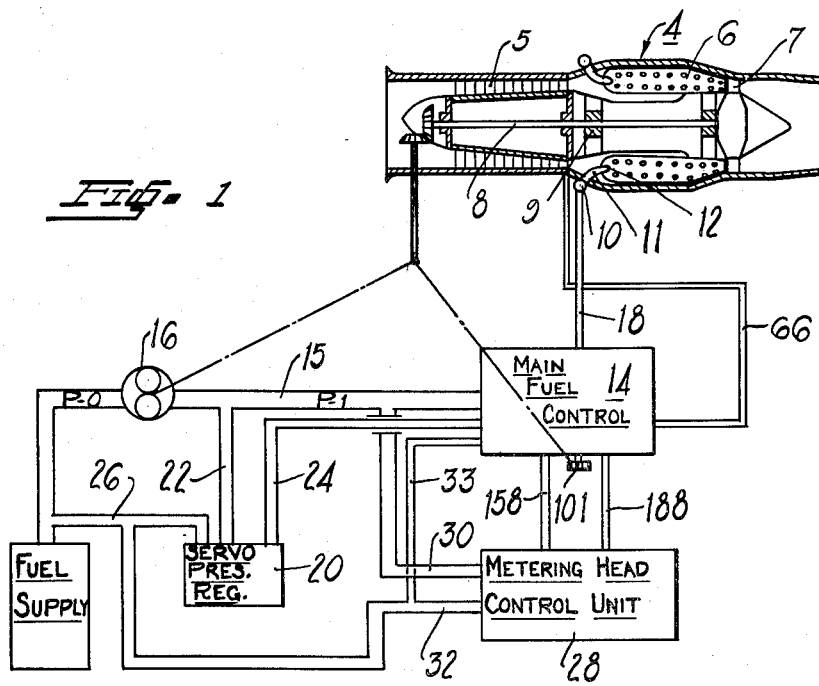
FIGURE 1 is a schematic of the gas turbine engine and a fuel system arranged in accordance with the present invention.

Referring now to FIGURE 1, numeral 4 represents a gas turbine engine having a compressor 5, combustion chambers 6 and a turbine 7. The compressor is driven by the turbine through a shaft 8 journalled in bearings 9. Fuel is communicated to the combustion chambers 6 from a manifold 10 via fuel lines 11 and nozzles 12.

A main fuel control 14 receives fuel at pump discharge pressure $P_1$ from a source via inlet conduit 15 and engine driven fuel pump 16 and discharges metered fuel to manifold 10 via conduit 18. A servo pressure regulator unit 20 receives fuel at pump discharge pressure $P_1$ by way of inlet conduit 22 and discharges fuel at a predetermined constant servo pressure $P_{RS}$ to the main fuel control 14 via conduit 24. A drain conduit 26 communicates the servo pressure regulator with conduit 15 at pump inlet pressure $P_0$. A metering head control unit 28 is provided with inlet and outlet conduits 30 and 32 which communicate with conduits 15 and 26 pressures $P_1$ and $P_0$ respectively. A drain conduit 33 connects main fuel control 14 with conduit 32.

Figure 2:
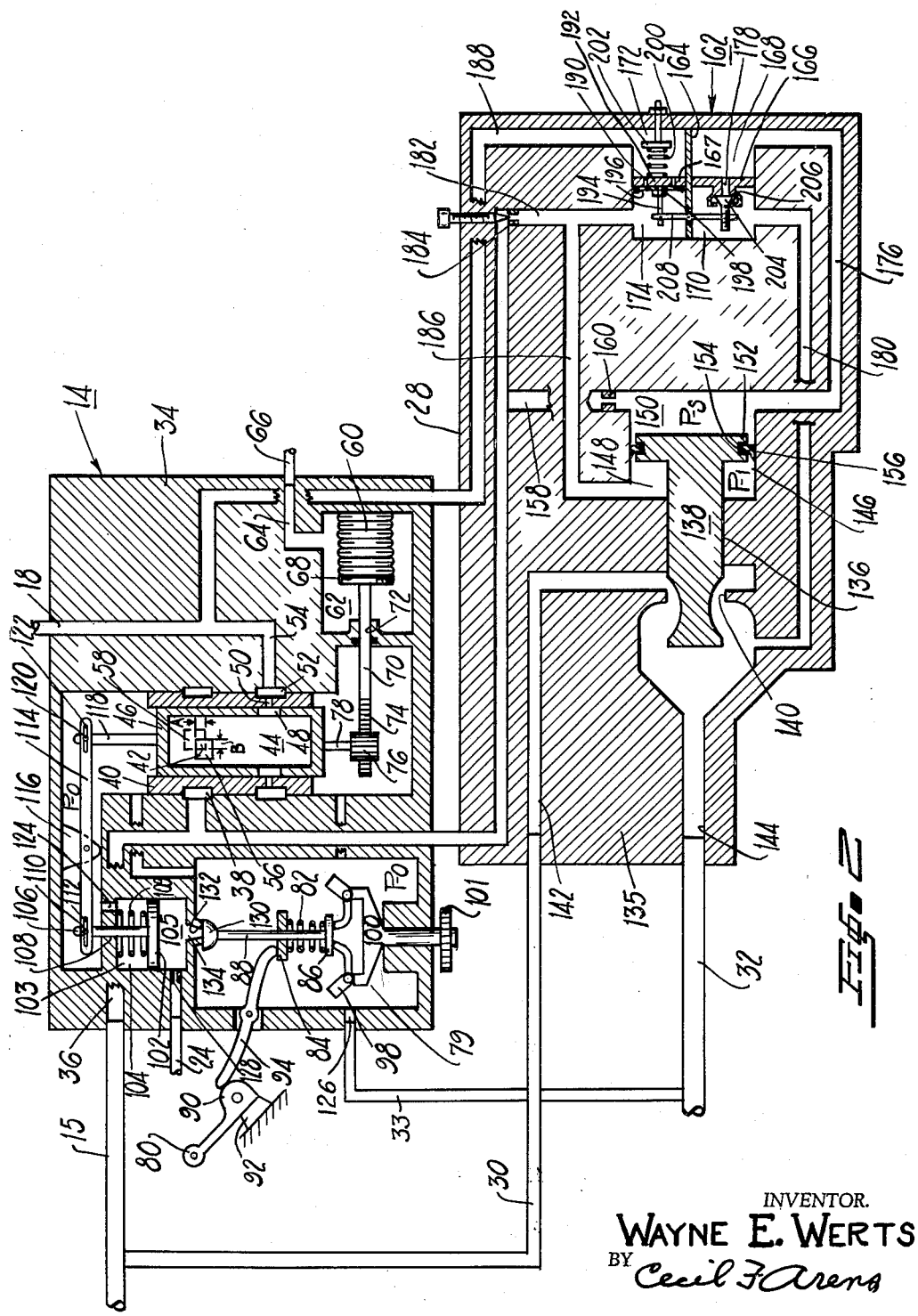
FIGURE 2 is a schematic illustration of the present invention shown removed from the engine drawn in enlarged form.

Referring now to FIGURE 2, the main fuel control 14 and the metering head control unit 28 are shown in sectional schematic form. The main fuel control 14 is provided with a casing 34 which receives fuel from conduit 15 through a passage 36. Fuel flows from the passage 36 to an inlet annulus 38 formed between the casing 34 and a fixed cylindrical sleeve member 40 thence through a main metering port 42 to a chamber 44 formed by an axially and rotatably actuable hollow cylindrical metering valve 46. Fuel flows from the chamber 44 through valve and sleeve outlet ports 48 and 50 thence through an outlet annulus 52 and a passage 54 to the discharge conduit 18.

Square port 56 formed in the wall of metering valve 44 is adapted to variably register with an associated square port 58 formed in the wall of fixed sleeve member 40 to vary the effective flow area of the main metering port 42 which connects the inlet annulus 38 to the valve chamber 44. The metering port is either square or rectangular in shape and the area thereof is determined by dimensions "A" and "B." Dimension "A" is varied whenever the axial position of the valve changes and dimension "B" varies whenever the rotational position of the valve changes.

The rotational position of the metering valve 46 and the "B" dimension are controlled by an evacuated bellows 60 which is mounted in a chamber 62. The bellows is fixedly secured at one end to casing 34 in a manner which provides an air tight seal. The chamber 62 is connected to the discharge side of the compressor via a passage 64 and conduit 66 (see FIGURE 1). A cover plate 68 is fixedly secured to the free end of bellows 60 by any suitable means such as a welded connection which provides an effective seal between the interior of bellows 60 and chamber 62 at a compressor discharge pressure $P_C$. A rod 70 is fixedly secured to the cover plate 68 and is slidably carried in an aperture 72 in casing 34. A rack 74 is formed on the rod 70 and engages a pinion 76 fixedly secured to a metering valve stem 78. A variation in compressor discharge pressure $P_C$ results in a variation in the pressure in chamber 62 which in turn causes a change in length of bellows 60 and subsequent rotation of the metering valve 46.

The axial position of the metering valve 46 and the size of "A" dimension are controlled by an engine all-speed governor 79 and a pilot throttle lever 80. The governor 79 is provided with a spring 82 interposed between a washer shaped spring retainer 84 and a thrust bearing 86 formed at the end of a stem 88 which extends axially through spring retainer 84 and is slidably engaged therewith. The spring 82 may be selectively set by the pilot through suitable linkage including a cam 90 which is rotatably mounted on a support 92 and a lever 94 rotatably carried by casing 34. When throttle lever 80 is rotated clockwise, the spring 82 is compressed and acts to reset a pair of governor weights 98 pivotally mounted on a carrier 100. The carrier 100 is provided with a pinion 101 which is drivably connected with the compressor 2. A piston 102 slidably contained in a chamber 104 divides the chamber into variable volume chambers 103 and 105 and is provided with an extension 106 which extends through an opening 108 at the end of chamber 104. The piston 102 is preloaded by means of a spring 109 interposed between the piston 102 and casing 34. A pin 110 secured to extension 106 is slidably carried in a slot 112 formed at one end of a lever 114 pivotally mounted on a support 116. A stem 118 fixedly secured to metering valve 46 carries a pin 120 which is slidably engaged in a slot 122 formed in the opposite end of lever 114. A port 124 vents the variable volume chamber 103 to the interior of casing 34 which in turn is vented to drain pressure $P_0$ via a port 126 connected to drain conduit 33. Fuel at regulated servo pressure $P_{RS}$ is communicated to variable volume chamber 105 from conduit 24 via a restricted passage 128. The fuel pressure $P_S$ in variable volume chamber 105 is controlled by a flapper valve 130 which coacts with a valve seat 132 to control the flow area of a passage 134 leading from chamber 105 to the interior of casing 34 at drain pressure $P_0$. The position of the flapper valve 130 relative to valve seat 132 is controlled by movement of stem 88 to which the flapper valve 130 is suitably connected.

When a selected speed of the engine is reached the governor weight force will balance the force of spring 82 thus holding stem 88 in equilibrium. For a given engine speed as determined by the setting of the pilot's throttle lever 80 this will occur at a fixed position of flapper valve 130 which establishes a corresponding $P_S$ pressure in chamber 105. This pressure acts to hold piston 102 and thus metering valve 46 at a position whereby the fuel flow required to maintain the selected speed is held at a constant value and the engine will operate at constant speed for the particular setting of the pilot's throttle lever 80.

The pressure differential across the main metering port 42 is maintained constant at a predetermined value irrespective of variations in the effective flow area of the port by the metering head control unit 28. The unit 28 is provided with a casing 135 having a bore 136 which slidably carries a by-pass valve 138, the contoured end of which coacts with a valve port 140 to vary the flow between a passage 142 connected to conduit 30 and a chambered passage 144 connected to conduit 32. The other end of the by-pass valve extends into a chamber 146 which is divided into variable volume chambers 148 and 150 by a pistion 152 formed at said end of the by-pass valve. A recess 154 formed in the peripheral edge of piston 152 contains a flexible sealing member 156 which slidably engages casing 134 and provides a seal between variable volume chambers 148 and 150. The variable volume chamber 150 receives fuel from conduit 36 via a conduit 158 in which a restriction 160 is removably secured.

A constant head regulating unit 162 is provided with a partition 164 and walls 166 and 167 which together with casing 134 form chambers 168, 170, 172 and 174. Variable volume chamber 150 communicates via a passage 176 with chamber 168 which in turn communicates with chamber 170 via a passage 178 in wall 166. The chamber 170 discharges to outlet passage 144 at drain pressure $P_0$ via a passage 180. The chamber 174 communicates with conduit 158 at unmetered fuel pressure $P_1$ via a passage 182 in which a variable area restriction 184 is secured. A branch passage 186 communicates variable volume chamber 148 with passage 182 downstream from restriction 184. A conduit 188 communicates outlet conduit at metered fuel pressure $P_2$ with chamber 172. An opening 190 in wall 167 between chambers 172 and 174 slidably receives a piston 192 to which a stem 194 is fixedly secured. A flexible sealing member 196 is aligned axially with the stem 194 and held in position against 192 by a nut 198 threadedly engaged with stem 194. The piston 192 is preloaded by a spring 200 interposed between the piston 192 and an adjustable spring retainer 202 threadedly engaged with casing 134. A flapper valve 204 coacts with a valve seat 206 to regulate the effective flow area of passage 178 and thus the pressure $P_S$ in variable volume chamber 150. A lever 208, pivotally carried by partition 164, has its opposite ends suitably connected to stem 194 and flapper valve 204 respectively.

*Operation*

Figure 3:
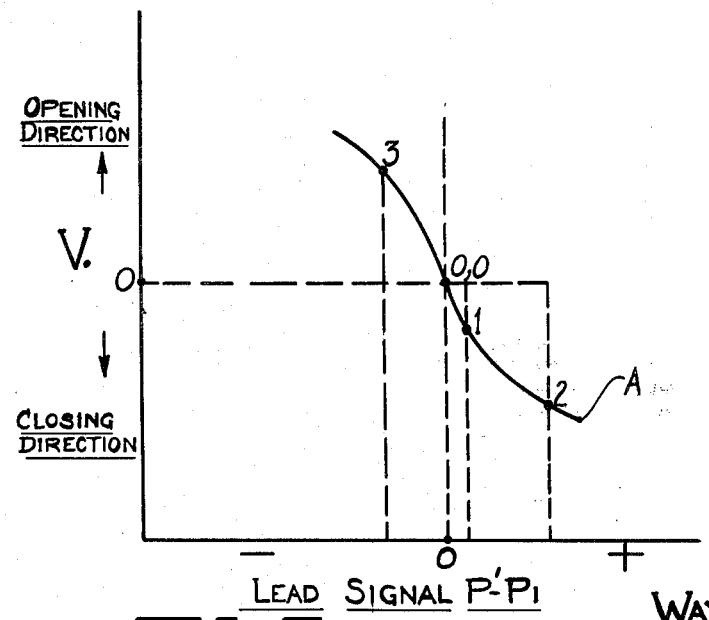
FIGURE 3 is a graph having a velocity versus error relationship.

If during engine operation, the pilot desires to establish a higher engine speed, throttle lever 80 is rotated in a direction to further compress spring 82 which overcomes the then existing force of weights 98 and moves valve 130 off its seat causing a drop in pressure in chamber 105. This reduction in pressure allows the piston 102 to move downward under the influence of spring 109. The lever 114 is rotated counterclockwise causing metering valve 46 to move upward thus increasing the "A" dimension of main metering port 42. As a result of this change in size of port 42 metered fuel pressure $P_2$ increases and differential pressure $P_1-P_2$ across the main metering port 42 drops. As the engine begins to accelerate in response to increasing fuel flow, compressor discharge pressure $P_C$ increases and causes the bellows 60 to contract which in turn actuates metering valve 46 in an increasing "B" dimension direction causing a corresponding increase in area in main metering port 42 and a further increase in discharge fuel pressure $P_2$. The piston 192 in the constant head unit 162 responds to the $P_1-P_2$ pressure differential occurring thereacross and acts to move lever 208 in a counterclockwise direction, which in turn causes flapper valve 204 to move towards valve seat 206 thus causing an increase in pressure $P_s$ in chamber 150. The pressure $P_s$ acts against the piston 152 which in turn repositions the by-pass valve 138 toward valve port 148 to reduce the amount of by-pass flow through valve port 140. As the by-pass valve moves toward the closed position, fuel is pumped from chamber 148 through passage 186 to passage 182. The pumping action results in a $P_1'-P_1$ pressure differential across restriction 184 and a $P_1'-P_2$ pressure differential across piston 192. The $P_1'-P_1$ pressure differential will depend upon the rate at which the by-pass valve 138 is displaced and acts as a lead or anticipating signal to the metering head control unit 162. When the by-pass valve moves slow the $P_1'-P_1$ differential is relatively small and when the valve moves fast the differential is relatively large. This action is shown by the curve of FIGURE 3 which represents a plot of by-pass velocity versus $P_1'-P_1$ pressure differential. Point 2 on the curve A represents an instant at which the by-pass valve is closing at a relatively fast rate at which time the corresponding $P_1'-P_1$ differential, or lead signal, is correspondingly large. Point 1 on the curve A represents an instant at which the by-pass valve is closing at a relatively slow rate with the $P_1'-P_1$ differential being correspondingly small. As $P_1$ pressure rises toward the value required to establish the predetermined $P_1-P_2$ pressure differential, the constant head control unit 162 responds to modify the servo pressure in variable volume chamber 150 and control the movement of the by-pass valve. Upon reaching the requested speed, the metering valve will be stabilized through the action of the weights 98 in the manner heretofore described. Subsequently, the $P_1'-P_1$ pressure signal diminishes along curve A toward point 0, 0 until it is no longer existent, at which time the action of the metering head control unit 162 is stabilized in response to the predetermined constant $P_1-P_2$ differential across the piston 192 which in turn controls the pressure $P_S$ in chamber 150 to a constant value to stabilize the by-pass valve.

Were it not for the $P_1'-P_1$ lead signal supplied to the constant head unit, the by-pass valve 138 would respond to the pressure $P_S$ in chamber 150, the control of which inherently lags behind changes in the $P_1-P_2$ pressure differential sensed by the constant head unit 162 and move beyond the position required to establish the proper $P_1$ pressure. The constant head metering control unit would, in response to the excessive $P_1$ pressure attempt to reverse the action of by-pass valve by dropping the pressure $P_S$ in chamber 150. In this manner fluctuations of the by-pass valve 138 would result in erratic control of the $P_1-P_2$ pressure differential across main metering port 42 and subsequent unstabilized engine operation.

If the $P_1-P_2$ differential across the metering valve 46 should increase beyond the predetermined constant value, the above mentioned sequence of operation would be reversed. For example, to decrease engine speed the control lever 80 is rotated counterclockwise to a position which corresponds to the selected speed.

This results in a reduction in the load of spring 82 whereupon the existing force of weights 98 overcomes the force of spring 82 and moves valve 130 against the seat 132 causing a rise in pressure $P_s$ in chamber 105. The rise in pressure $P_s$ causes piston 102 to move upward which in turn rotates lever 114 in a clockwise direction causing metering valve 46 to move downward. As a result the "A" dimension of metering port 42 decreases which in turn causes a drop in metered fuel pressure $P_2$ and a corresponding increase in the pressure differential $P_1-P_2$ across metering port 42, such that fuel flow to the engine is decreased. The metering head control unit 162 is unbalanced in response to the increased $P_1-P_2$ differential and causes a corresponding actuation of flapper valve 204 away from valve seat 206. The resulting reduction in pressure $P_s$ in chamber 150 causes the piston 152 and by-pass valve 138 to move to the right causing an increase in the volume of chamber 148 and a corresponding pressure drop in passage 186, passage 182 downstream from restriction 184, and chamber 174. The $P_1'-P_1$ differential thus established across restriction 184 is negative in value and contributes a lead or anticipatory signal to the metering head control unit 162 which in turn causes a modification of the pressure $P_s$ accordingly. The curve A of FIGURE 3 illustrates the manner in which the $P_1'-P_1$ lead signal varies with relation to the rate of movement of the by-pass valve 138. Point 3 on curve A is representative of the initial velocity of by-pass valve 138 and the corresponding $P_1'-P_1$ lead signal which occurs subsequent to the request for a lower engine speed.

As the $P_1-P_2$ differential approaches the predetermined constant value, the metering head control unit 162 functions to cause a progressive decrease in the rate of movement of the by-pass valve 138 which results in a corresponding decrease in the $P_1'-P_1$ lead signal. When the engine reaches the selected speed, the by-pass valve 138 is stabilized in response to the predetermined constant differential $P_1-P_2$ in the manner heretofore described.

The adjustable restriction 194 may be adjusted to provide variations in the $P_1'-P_1$ lead signal depending upon the characteristics of the system and the behavior of the by-pass valve 146.

Although only one embodiment of the present invention has been schematically illustrated and described, it will be apparent to those skilled in the art that various changes in the structure and relative arrangement of parts may be made to suit individual requirements without departing from the spirit and scope of the present invention.

I claim:

1. In a fluid control system the combination of a source of fluid; a receiver; a first conduit connected between said source of fluid and said receiver; valve means in the first conduit for controlling the effective flow area thereof; a second conduit connected between said first conduit and said source of fluid; servo pressure responsive valve means in said second conduit for controlling the effective flow area thereof; control means for controlling the servo pressure to which said second named valve means responds and thus the position of said second named valve means, said control means having a first fluid connection with the inlet side of said first named valve means and a second fluid connection with the outlet side of said first named valve means and being responsive to the pressure differential across said first named valve means; and hydraulic feedback means operably connected to said servo pressure responsive valve means and said control means for modifying the pressure in said first fluid connection as a function of the rate of displacement of said second named valve means.

2. In a fluid control system: a source of fluid; a receiver; a pump having an inlet connected to said source of fluid; a first conduit connected between said receiver and an outlet of said pump; first valve means operative with said first conduit for controlling the effective flow area thereof; operator-operated means connected to said first valve means, said first valve means being actuable as a function of the position of said operator-operated means; a second conduit connected between the inlet and outlet of said pump; second valve means responsive to a servo fluid pressure for controlling the effective flow area of said second conduit; control means for controlling the servo pressure to which said second valve means responds; a first fluid connection between the upstream side of said first valve means and said control means; a second fluid connection between the downstream side of said first valve means and said control means; said control means being responsive to variations in a predetermined constant pressure differential across said first valve means; a restriction in said first fluid connection; and hydraulic feedback means operably connected between said second valve means and said control means for creating a pressure drop across said restriction in accordance with the rate of displacement of said second valve means.

3. In a fluid control system as claimed is claim 2 wherein said restriction is adjustable to vary the pressure drop thereacross for a given condition of operation.

4. In a fuel control system for a gas turbine engine having a combustion chamber; a source of fuel under pressure; a conduit connected to said source of pressurized fuel and adapted to be connected to said combustion chamber; a restriction in the conduit; first valve means in the conduit for controlling the flow area of said restriction; fuel by-pass valve means for controlling the pressure in said conduit upstream from said restriction; actuating means operatively connected to said fuel by-pass valve means and responsive to a servo fluid pressure control means operably connected to said by-pass valve means, said control means including a servo valve for controlling said servo fluid pressure, a pressure differential responsive member operatively connected to said servo valve for actuating the same, said pressure differential responsive member being provided with separate fluid connection with the fluid pressures in said conduit upstream and downstream from said first valve means; said control means being operable in response to variations from a predetermined constant pressure differential between said separate fluid connection to vary the position of said by-pass valve means and readjust the pressure in said conduit to re-establish said predetermined constant pressure differential; and hydraulic feedback means operably connected between said actuating means and said control means, said feedback means acting to modify the pressure in one of said separate fluid connections to said control means as a function of the rate of displacement of said by-pass valve means to progressively damp the movement of the by-pass valve means as the pressure differential across said first valve means approaches the predetermined constant value.

5. In a fluid control system: a source of fluid; a receiver; a conduit connected between said source of fluid and said receiver; a pump in said conduit for pressurizing the fluid therein; a restriction in said conduit; a valve member for controlling the effective flow area of said restriction; a by-pass conduit connected between said conduit upstream from said restriction and said source of fluid; a by-pass valve in said by-pass conduit for controlling the fluid flow therethrough; a chamber; a pressure responsive member slidably disposed in said chamber and dividing the chamber into first and second variable volume chambers, said pressure responsive member being connected to said by-pass valve; control means for controlling a servo pressure in said second variable volume chamber, said control means having a first fluid connection with said conduit upstream from said restriction and a second fluid connection with said conduit downstream from said restriction; an adjustable restriction in said first fluid connection; a passage connected between said first variable volume chamber and said first fluid connection between said adjustable restriction and said control means; said control means being actuated in response to variations from a predetermined constant pressure differential across said restriction to cause an actuation of said pressure responsive member such that said bypass valve moves to re-establish said predetermined constant pressure differential, said actuation of said pressure responsive member causing a transfer of fluid between said first variable volume chamber and said first fluid connection, said transfer of fluid acting to vary the pressure differential sensed by said control means such that the by-pass valve movement is damped progressively as a function of the rate of movement of said pressure responsive member as the pressure differential across said restriction approaches the predetermined constant value.

6. In a fluid control system: the combination of a source of pressurized fluid; a receiver; a conduit connected between said source and said receiver; first valve means operative with said conduit for controlling the fluid flow through said conduit to said receiver; a control member operatively connected to said first valve means; said first valve means being positioned in said conduit as a function of the position of said control member; a by-pass conduit connected between said conduit and a sump; second valve means operative with said by-pass conduit for controlling the fluid pressure differential across said first valve means; means responsive to a servo fluid pressure operatively connected to said second valve means for controlling the position of said second valve means in said by-pass conduit; control means operatively connected to said first valve means and responsive to the pressure differential across said first valve means, said control means having an operative connection with said servo fluid pressure for controlling said servo fluid pressure as a function of variations of said pressure differential from a predetermined constant value; and a fluid connection between said servo fluid pressure responsive means and said control means for supplying a fluid pressure signal between said servo fluid pressure responsive means and said control means, said fluid pressure signal being indicative of the rate of movement of said second valve means and acting to modify directly the pressure differential sensed by said control means in accordance with the relative error existing between the sensed pressure differential and said predetermined constant value.

7. In a fluid control system the combination of a source of fluid: a receiver; a conduit for supplying fluid from said source to said receiver; a pump for pressurizing the fluid in said conduit; valve means operatively connected to said conduit for controlling the fluid flow through said conduit; control means including a passage connected to receive a variable control fluid pressure and means responsive to the variable control fluid pressure operatively connected to said valve means for controlling the position of said valve means as a function of said variable control fluid pressure; and means including a restriction in said passage and a fluid connection operatively connected between said passage downstream from said restriction and said valve means to transmit a pressure generated by movement of said valve means through said fluid connection for modifying said control fluid pressure as a function of the rate of displacement of said valve means.

8. In a fluid control system: the combination of a source of fluid; means for pressurizing the fluid; a receiver; a conduit connected between said pressurizing means and said receiver; valve means in said conduit for controlling fluid flow therethrough; a by-pass conduit connected between said conduit upstream from said valve means and said source of fluid; a by-pass valve in said by-pass conduit for controlling fluid flow therethrough; control means for controlling the operation of said by-pass valve in accordance with variations from a predetermined constant pressure differential across said valve means, said control means having a first restricted fluid connection with said conduit upstream from said valve means and a second unrestricted fluid connection with said conduit downstream from said valve means, and being responsive to the pressure differential across said valve means, and means including a floating piston operatively connected to said by-pass valve and said control means for modifying the pressure in said first fluid connection downstream from the restriction therein as a function of the rate of displacement of said by-pass valve as the pressure differential across said valve means approaches said predetermined constant value.

9. In a fluid control system: the combination of a source of fluid under pressure; a receiver for said fluid; a conduit connected to deliver fluid from said source to said receiver valve means in said conduit for controlling fluid flow therethrough; fluid by-pass valve means operatively connected to said conduit for controlling the fluid pressure in said conduit upstream from said valve means; control means operatively connected to said by-pass valve means, said control means including a floating piston connected to actuate said by-pass valve means; a first variable volume fluid chamber partially defined by said floating piston; a second variable volume fluid chamber partially defined by said floating piston in which a servo pressure is maintained; a servo valve connected to control said servo pressure; a fluid pressure differential responsive member connected to control the operation of said servo valve; a first fluid connection between the upstream side of said valve means and one side of said pressure differential responsive means; a second fluid connection between the downstream side of said valve means and said pressure differential responsive means; a restriction in said first fluid connection; and a passage connecting said first variable volume chamber and said first fluid connection downstream from said restriction, said control means being operative in response to variations from a predetermined constant pressure differential across said valve means to vary the position of said by-pass valve means and readjust the fluid pressure in said conduit to thereby re-establish said predetermined constant fluid pressure differential, said floating piston being operative in response to said servo pressure to cause a transfer of fluid between said first variable volume chamber and said first fluid connection whereby the pressure drop across said pressure differential responsive means is modified as a function of the rate of displacement of said floating piston.

References Cited in the file of this patent

UNITED STATES PATENTS

| | | |
|---|---|---|
| 2,020,847 | Mitereff | Nov. 12, 1935 |
| 2,320,508 | Burns et al. | June 1, 1943 |
| 2,633,830 | McCourty et al. | Apr. 7, 1953 |
| 2,757,511 | Jagger | Aug. 7, 1956 |
| 2,765,800 | Drake | Oct. 9, 1956 |

FOREIGN PATENTS

| | | |
|---|---|---|
| 698,281 | Great Britain | Oct. 14, 1953 |
| 585,032 | Great Britain | Jan. 29, 1947 |

OTHER REFERENCES

Article "Spray Spill-Burner Fuel System," pages 133–139, May 1953 issue of "Aircraft Engineering."